United States Patent [19]
Amone et al.

[11] Patent Number: 5,412,065
[45] Date of Patent: May 2, 1995

[54] POLYIMIDE OLIGOMERS

[75] Inventors: Michael Amone, Carmel; Mark Southcott, Brewster, both of N.Y.

[73] Assignee: Ciba-Geigy Corporation, Ardsley, N.Y.

[21] Appl. No.: 45,395

[22] Filed: Apr. 9, 1993

[51] Int. Cl.⁶ .................. C08G 73/10; C08G 69/26
[52] U.S. Cl. ............................ 528/353; 528/125; 528/128; 528/171; 528/172; 528/173; 528/174; 528/176; 528/183; 528/185; 528/188; 528/220; 528/229; 528/350; 528/352; 526/285
[58] Field of Search .......... 528/350, 353, 352, 125, 528/176, 128, 174, 172, 183, 173, 185, 171, 220, 229, 188; 526/285

[56] References Cited

U.S. PATENT DOCUMENTS

| | | | |
|---|---|---|---|
| 3,105,839 | 10/1963 | Renner | 549/237 |
| 3,528,950 | 9/1970 | Lubowitz | 528/229 |
| 3,745,149 | 7/1973 | Serafini et al. | 528/353 |
| 3,803,081 | 4/1974 | Lubowitz | 524/538 |
| 3,856,752 | 12/1974 | Bateman et al. | 528/353 |
| 3,983,093 | 9/1976 | Williams, III | 528/353 |
| 4,395,527 | 7/1983 | Berger | 528/26 |
| 4,480,009 | 10/1984 | Berger | 428/447 |
| 4,552,931 | 11/1985 | St. Clair et al. | 528/353 |
| 4,794,157 | 12/1988 | Berdahl et al. | 528/208 |
| 4,830,953 | 5/1989 | Bateman | 430/197 |
| 4,959,440 | 9/1990 | Tamai et al. | 528/125 |
| 4,980,481 | 12/1990 | Lubowitz et al. | 548/435 |
| 4,981,922 | 1/1991 | Sheppard et al. | 525/422 |
| 5,087,701 | 2/1992 | Lubowitz et al. | 548/431 |
| 5,196,506 | 3/1993 | Tamai | 528/353 |
| 5,210,174 | 5/1993 | Tamai et al. | 528/353 |

FOREIGN PATENT DOCUMENTS

| | | |
|---|---|---|
| 0422885 | 4/1991 | European Pat. Off. . |
| 62-231935 | 12/1987 | Japan . |
| 62-231936 | 12/1987 | Japan . |
| 8604079 | 7/1986 | WIPO . |

OTHER PUBLICATIONS

24th International SAMPE Technical Conference, Oct. 1992 pp. T983-T991.
Patent Abstract of Japan, vol. 7, No. 108, 58-29821, Feb. 22, 1983.

Primary Examiner—Samuel A. Acquah
Assistant Examiner—P. Hampton-Hightower
Attorney, Agent, or Firm—William A. Teoli, Jr.

[57] ABSTRACT

Polyimide oligomers are described which comprise the intercondensation product of a monomer mixture comprising (A) at least one aromatic bis(ether anhydride), (B) at least one phenylindane diamine, and (C) at least one end-cap monomer selected from the group consisting of monoanhydrides, acyl halides and amines, wherein each end-cap monomer (C) contains at least one crosslinkable group in the molecule and wherein the phenylindane diamine component (B) is present in the mixture in a stoichiometric excess. The monomers react in a suitable solvent under an inert atmosphere to form polyimide oligomers having a number average molecular weight of from about 1,000 to about 15,000. The polyimide oligomers of the present invention are readily processed to form polyimide matrix resins with high temperature and oxidative stability.

17 Claims, No Drawings

POLYIMIDE OLIGOMERS

TECHNICAL FIELD

The present invention relates to polyimide oligomers having high thermal and oxidative stability and to their method of manufacture. More particularly, the present invention relates to polyimide oligomers that can be readily prepregged and cured to form advanced composites having aerospace applications.

BACKGROUND OF THE INVENTION

Polymer-based composite materials are used in applications requiring performance at temperatures ranging from below ambient to 500° F. Typical applications include: compressor blades, ducts, splitters and thrust-vectoring flaps for jet engines, missile fins, wing components, radar domes, and other aerospace structures. Polyimide resins have been employed in such applications due to their high temperature and thermal stability properties.

Polyimide resins are generally produced either by condensation polymerization directly or by addition polymerization followed by a condensation rearrangement reaction to form the heterocyclic rings. Accordingly, $H_2O$ is a reaction product in either case and creates inherent difficulties in producing void-free composites. Voids have a deleterious effect on the shear strength, flexural strength, and dielectric properties of polyimide based composites.

In order to achieve high performance it has been previously proposed to use fully prereacted thermoplastic polyimides as the composite matrix. However, in this case the softening point or $T_g$ of the polyimide resin must be substantially above the intended use-temperature. Accordingly, a very high processing temperature is required which has the risk of causing pyrolytic degradation of the resin. Moreover, the pressure needed to achieve the required resin flow often is higher than commercially available equipment is capable of sustaining.

More recently, soluble polyimides, such as those described in Bateman et al U.S. Pat. No. 3,856,752 which is assigned to the same assignee as the present invention, have been described. Such polyimides require a volatile vehicle to achieve the required resin flow. As the vehicle is removed, however, the resin increases in viscosity. Accordingly, providing enough resin to achieve void free composites can be a problem.

Polyimide materials that are derived from in situ reacted monomers and oligomers have been used successfully in high performance environments. Processing problems normally associated with resin flow are less severe for such materials owing to their low molecular weight. One such material is PMR-15 which is described in U.S. Pat. No. 3,745,149. The acronym PMR stands for in situ polymerization of monomeric reactants. The -15 refers to a formulated molecular weight of 1500. PMR-15 is an addition polyimide derived from the dimethyl ester of benzophenone tetracarboxylic dianhydride (BTDE), the monomethyl ester of nadic anhydride (NE) and 4,4'-methylene dianiline (MDA). Addition polymerization is made possible by the use of the nadic end groups, which react without further evolution of volatiles at 250°–350° C.

While PMR-15 provides significant benefits, this resin and intermediate materials (e.g., prepregs) derived from it have certain disadvantages. Among these are toxicity, short shelf life, and handling difficulties during processing. The toxicity originates from MDA which is considered a suspect human carcinogen by the U.S. Environmental Protection Agency. Such real or perceived risks associated with PMR-15 are expected to hamper subsequent applications for this material.

Accordingly, there continues to be a need for addition-type polyimides for high performance applications, such as aerospace needs, which require elevated temperature performance in combination with reduced toxicity, chemical stability and greater ease in processing.

SUMMARY OF THE INVENTION

The present invention addresses the above-noted and other disadvantages by providing polyimide oligomers comprising the intercondensation product of a monomer mixture comprising (A) at least one aromatic bis(ether anhydride), (B) at least one phenylindane diamine, and (C) at least one end-cap monomer selected from the group consisting of monoanhydrides, acyl halides and amines, wherein each end-cap monomer (C) contains at least one crosslinkable group in the molecule and wherein the phenylindane diamine component (B) is present in the mixture in a stoichiometric excess. The monomers react in a suitable solvent under an inert atmosphere to form polyimide oligomers having a number average molecular weight of from about 1,000 to about 15,000. The polyimide oligomers of the present invention are readily processed to form polyimide matrix resins with high temperature and oxidative stability.

DETAILED DESCRIPTION OF THE INVENTION

In one of its aspects, the present invention pertains to polyimide oligomers comprising the intercondensation reaction product of a reaction mixture comprising (A) at least one aromatic bis(ether anhydride) represented by the formula

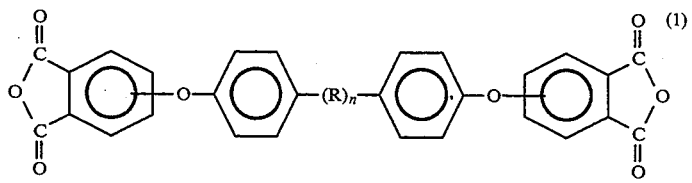

wherein R is a divalent radical selected from the group consisting of

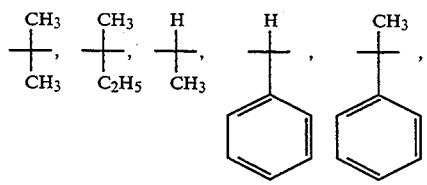

-continued

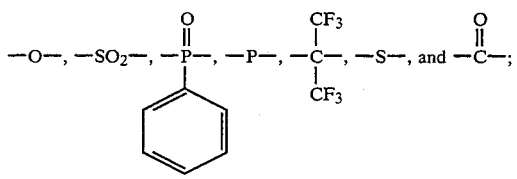

and n is 0 or 1;

(B) at least one phenylindane diamine represented by the formula

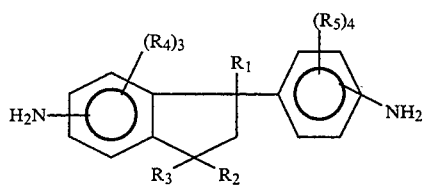

(2)

wherein R₁, R₂ and R₃ independently are hydrogen or an alkyl group of from 1 to 4 carbon atoms, and each R₄ and each R₅ independently is hydrogen, halogen or alkyl having 1 to 4 carbon atoms; and (C) at least one end-cap monomer selected from the group consisting of monoanhydrides, acyl halides and amines, wherein each end-cap monomer (C) contains at least one crosslinkable group in the molecule; and wherein the phenylindane diamine component (B) is present in the reaction mixture in a stoichiometric excess.

In one embodiment, the molar ratio (A)+(C):(B) generally is from about 0.81:1.0 to about 1.47:1.0. More particularly, the molar ratio (A):(B):(C) employed in the intercondensation reaction is about 0.75–0.97:1.0:0.06–0.50, more often, about 0.84–0.93:1.0:0.14–0.32 and, most often, about 0.80–0.88:1.0:0.24–0.40.

(A) Aromatic Bis(ether anhydrides)

The aromatic bis(ether anhydrides) (A) can be prepared by a number of known methods and many are commercially available. For example, the bis(ether anhydrides) (A) are prepared by coupling an appropriate xylene derivative, such as 4-bromoxylene or the alkali metal phenoxide of 4-xylenol, with an appropriate halide or aryloxide, via the Ullman Synthesis. This reaction employs a copper catalyst, followed by oxidation of the aromatic methyl groups and dehydration to effect ring closure as described in U.S. Pat. No. 4,480,009 which is incorporated by reference herein for its disclosure pertaining to this reaction. The reaction is shown below.

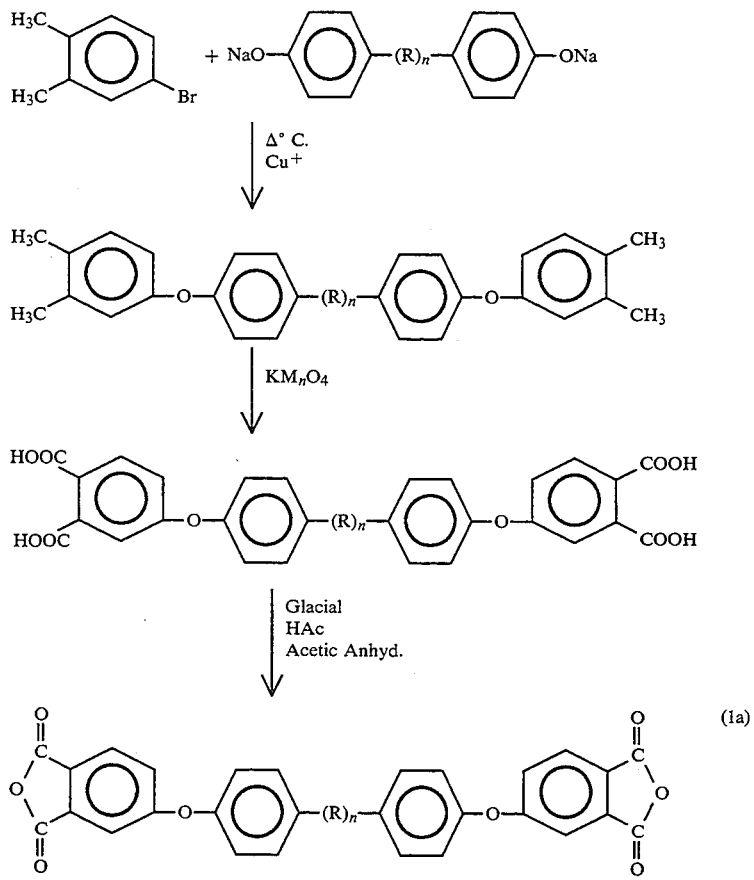

wherein R and n are defined above.

In a preferred embodiment, the aromatic bis(ether anhydride) (A) is represented by the foregoing formula (1a), R is selected from the group consisting of

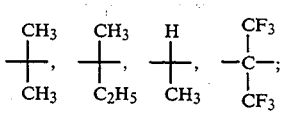

and n is 1.

Illustrative aromatic bis(ether anhydrides) (A) include 2,2-bis[4,4'-di(3,4-dicarboxyphenoxy)phenyl]propane dianhydride (BPADA), 2,2-bis[4,4'-di(2,3-dicarboxyphenoxy)phenyl]propane dianhydride, 1,1-bis[4,4'-di(3,4-dicarboxyphenoxy)phenyl]ethane dianhydride, and 1,3-trifluoro-2,2-bis[4,4'-di(3,4-dicarboxyphenoxy)phenyl]propane dianhydride.

BPADA is preferred and is represented by the structural formula

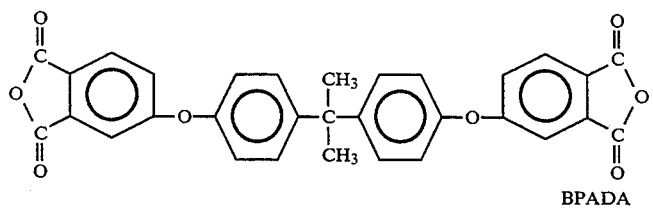

BPADA (B) Phenylindane Diamines

An essential feature of the polyimide oligomers of the present invention is the presence of structural units derived from phenylindane diamine monomers. The phenylindane diamines (B) are commercially available and also can be prepared by synthetic routes disclosed, for example, in U.S. Pat. No. 3,856,752 which is incorporated by reference herein. For example, the acid catalyzed dimerization of styrene or substituted styrenes is used to produce the given phenylindane. Then, by subsequent nitration and reduction of the phenylindanes, the phenylindane diamines are produced. One method of achieving alkyl substitution on the aromatic rings of the phenylindane diamines is by subjecting alkyl substituted benzaldehyde, acetophenone and the like to a Grignard reaction, followed by water removal to produce the alkyl substituted styrene compound. Dimerization, nitration and reduction can then be effected as mentioned above.

Illustrative phenylindane diamines (B) are the isomeric or substituted isomeric phenylindane diamino compounds. Among the phenylindane diamines of the formula (2), those are preferred in which $R_1$, $R_2$ and $R_3$ are hydrogen or methyl; and each $R_4$ and each $R_5$ independently of one another are hydrogen, methyl, chloro or bromo. A more preferred phenylindane diamine of the formula (2), in which $R_1$, $R_2$ and $R_3$ are methyl, and $R_4$ and $R_5$ are hydrogen, is known as DAPI. DAPI has the structural formula

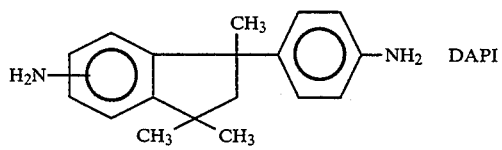

(C) End-cap Monomers

The end-cap monomer (C) is selected from the group consisting of monoanhydrides, acyl halides and amines. Such monomers contain at least one crosslinkable group which reacts without evolution of volatiles, due to imidization, during the curing of the oligomers. Illustrative crosslinkable groups include vinyl, ethynyl, maleimido, cyano, nadic and acetylenic functions. Suitable end-cap monomers (C) are prepared by a variety of known methods and many are commercially available.

For example, monoanhydrides are prepared by dehydration of the corresponding dicarboxylic acid with a dehydrating agent such as acetic anhydride, trifluoroacetic anhydride, dicyclohexylcarbodiimide, methoxyacetylene and P2O5. Suitable aromatic dicarboxylic acids are obtained by oxidation of the corresponding aromatic compound with ruthenium tetroxide and NaOCl.

The acyl halides are obtained, for example, by reacting the corresponding carboxylic acid with an inorganic acid halide such as thionyl chloride or by halogenation of the corresponding aldehyde.

Amines are obtained by numerous methods known in the art including direct amination of alkanes or aromatic rings, arylation or alkylation of ammonia or amines and free-radical addition of amines to olefins. Preferably, when (C) is an amine, (C) is a $C_{(6-30)}$ aromatic amine.

Illustrative end-cap monomers (C) include those represented by the following formulae (c-1) through (c-8)

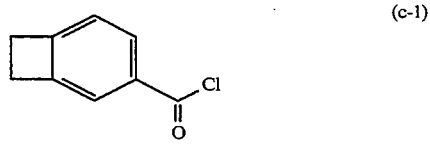
(c-1)

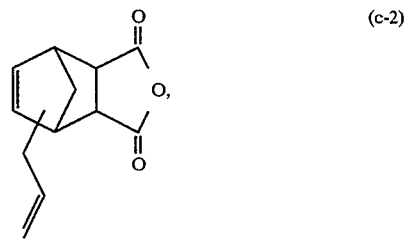
(c-2)

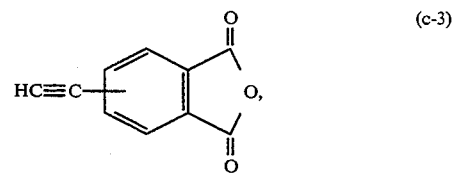
(c-3)

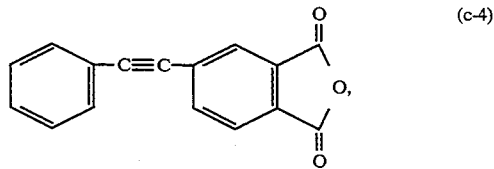
(c-4)

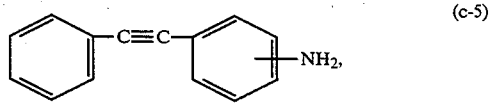
(c-5)

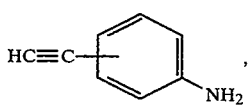 (c-6)

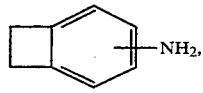 (c-7)

and

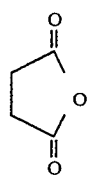 (c-8)

A particularly suitable end-cap monomer (C) is dinadicimidobenzoic acid chloride (also called 3,5-dinadic benzoyl chloride or DNBC) which is conveniently prepared as follows:

EXAMPLE A

Synthesis of Dinadicimidobenzoic acid

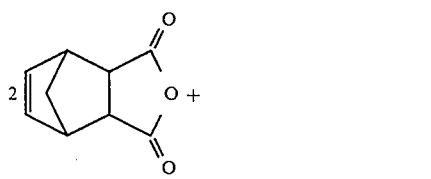

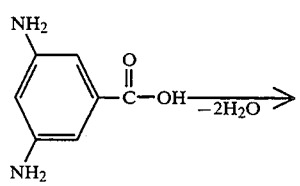

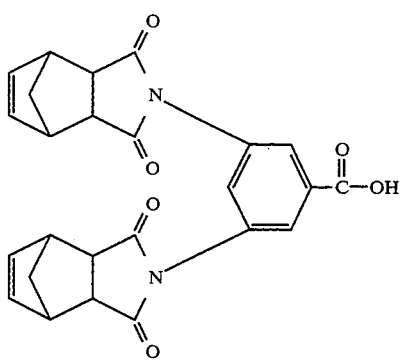

In a 6 liter sulfonation flask, equipped with stirrer, condenser and thermometer, 2,800 ml acetic acid 100% (glacial) and 393.9 g of nadicanhydride (2.40 mole) are placed under nitrogen. While stirring, 182.6 g of 3,5-diaminobenzoic acid (0.20 mole) is added and the reaction mixture is heated to reflux (113° C.). The now dark solution is stirred at reflux for 6 hours and then cooled to 100° C. A portion of charcoal is added and the mixture is stirred for 15 minutes. The hot solution is then filtered through a preheated-buchner-funnel. Subsequently, the mixture is cooled, under stirring, to room temperature (at 80° C. a precipitate crystallizes). The white precipitate is filtered off, washed twice with 200 ml of acetic acid and then with approximately 3 l of water (about neutral). The product is dried under vacuum at 80°–90° C. overnight.

| | Yield: 440 g (82%) | |
|---|---|---|
| | Calc. | Found |
| C: | 67.56% | 67.40% |
| H: | 4.54% | 4.45% |
| N: | 6.30% | 6.28% |
| Fp: | 238° C. | |

EXAMPLE B

Synthesis of Dinadicimidobenzoic acid chloride

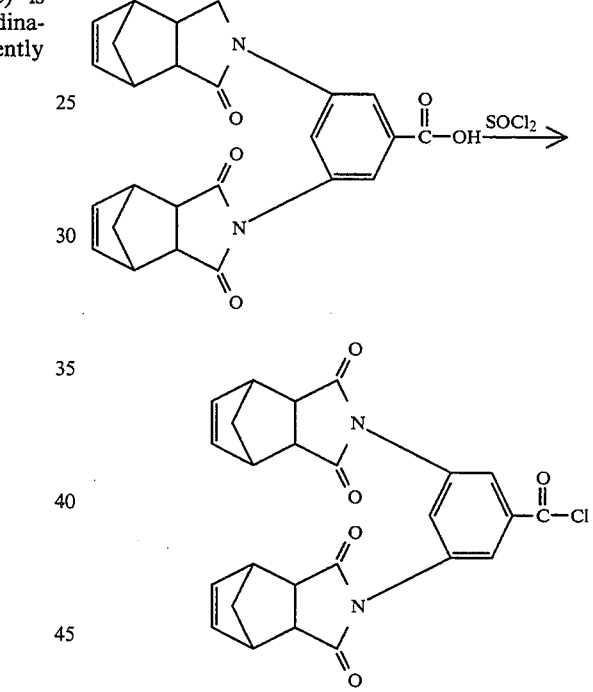 (c-9)

In a 2.5 liter sulfonation flask, equipped with stirrer, thermometer, condenser (cooled with ice-water), and gas absorption trap, is placed 1,350 ml methylene chloride, 333.3 g dinadicimidobenzoic acid (0.75 mole) and 11.0 g N,N-dimethylformamide. The mixture is heated to reflux with stirring. Over a period of 3 hours, 111.5 g of distilled thionyl chloride (0.938 mole, theory+25%) is added from a dropping funnel under the surface of the reaction mixture. The mixture is stirred for an additional 10–12 hours until no further $HCl/SO_2$ is evolved. Then, the slightly brownish solution is transferred into a 2.5 liter round bottom flask and the solution is concentrated on a rotary evaporator to approximately 600 ml. Subsequently, the concentrated solution is added, under stirring, to 2,500 ml of cyclohexane and the combined solution is stirred for 15 minutes. DNBC is recovered as a white precipitate, is filtered, washed with 300 ml of cyclohexane and dried in a vacuum oven at 40°–50° C. overnight.

| Yield: 346 g (100%) | | |
|---|---|---|
| | calc. | found |
| C: | 64.87% | 64.83 |
| H: | 4.14% | 4.20 |
| N: | 6.05% | 6.11 |
| Cl: | 7.66% | 7.45 |

Polyimide Oligomers

The product obtained by the intercondensation reaction of components (A), (B) and (C) comprises at least one polyimide oligomer represented by the following formulae

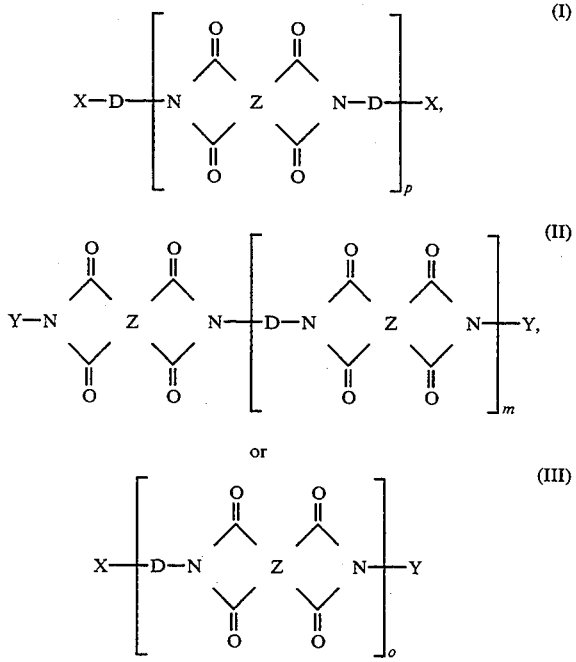

wherein
Z is a tetravalent radical represented by the formula

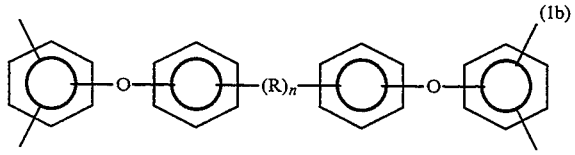

wherein R and n have their previous meanings;
D is a divalent radical represented by the formula

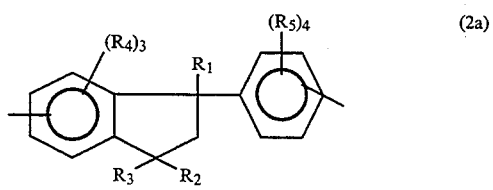

wherein $R_1$, $R_2$, $R_3$, $R_4$ and $R_5$ have their previous meanings;
X is amino (—$NH_2$) or a monovalent radical selected from the group consisting of N-imides and N-amides, each containing at least one crosslinkable group in the radical;
Y is a monovalent $C_{(60-30)}$ aromatic hydrocarbon radical containing at least one crosslinkable group in the radical; and
m, o and p have numerical values of from about 3 to about 20.

It will be readily appreciated that the N-imides and N-amides X are derived, for example, from the monoanhydride and acyl halide end-cap monomers (C), respectively. Similarly, the monovalent $C_{(6-30)}$ aromatic hydrocarbon radicals Y are derived, for example, from amine end-cap monomers (C). When radical X is amino, this indicates that the oligomer is terminated by a phenylindane diamine monomer (B).

As noted above, the end-capping radicals X and Y contain at least one crosslinkable group which reacts without evolution of volatiles, due to imidization, during the curing of the oligomers in a composite material. The illustrative crosslinkable groups include vinyl, ethynyl, maleimido, cyano, nadic and acetylenic functions.

Generally and preferably, the polyimide oligomers (I), (II) and (II) will have a number average molecular weight ($M_n$) of from about 1000 to about 15,000, more often, from about 3,000 to about 10,000 and, most often, from about 4,000 to about 7,000.

The polyimide oligomers obtained by the intercondensation reaction will vary considerably and will depend, in part, upon the amount and type of monomeric components employed in the reaction and on the molar ratio of the monomeric components.

In one embodiment, the monomeric components employed in the reaction consist essentially of monomers (A), (B) and (C).

In another embodiment, the reaction mixture is substantially free from monomeric components other than (A), (B) and (C).

In another embodiment, the present invention contemplates mixtures of oligomers having varying degrees of oligomerization.

The polyimide oligomers (I), (II) and (III) are prepared by a process comprising reacting the monomers (A), (B) and (C) in an organic reaction medium which is a solvent for at least one of the reactants, preferably under substantially anhydrous conditions, under an inert atmosphere and at a temperature below 100° C. and conveniently at room temperature. The product of this reaction is a polyamide acid represented by the following formula:

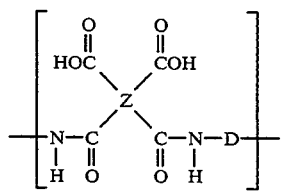

The polyamide acid is subsequently convened to the polyimide by several methods which include (1) heating the polyamide acid solution at temperatures between 100° C. and 240° C. depending on the boiling point of the organic solvent (preferably an azeotropic solvent, e.g.—toluene), until imidization is complete or; (2) by chemical means, e.g. by adding to the polyamide acid solution a dehydrating agent such as acetic anhydride alone or in combination with a tertiary amine catalyst such as pyridine or triethylamine, preferably at room temperature.

More specifically, the preparation of the polyamide acid which is subsequently converted to the polyimide can be conveniently carried out in a number of ways. The diamines and dianhydrides can be premixed as dry solids in equivalent amounts and the resulting mixture can be added, in small portions and with agitation, to an organic solvent. Alternately, this order of addition can be reversed, e.g., after premixing the diamine and the dianhydride, the solvent may be added to the mixture with agitation. It is also possible to dissolve the diamine in the solvent while agitating and to add slowly the dianhydride in portions that provide a controllable rate of reaction. However, this order of addition can also be varied. Still another process involves dissolving the diamine in one portion of a solvent and the dianhydride in another portion of the same or another solvent and then mixing the two solutions.

To effect the conversion of the polyamide acids to the polyimides, the polyamide acids are heated above 50° C. and preferably in an inert atmosphere and more preferably to between 110° to 240° C. in an inert atmosphere. In the preferred process, the polyamide acids are prepared at a temperature below 50° C. and maintained at this temperature until maximum viscosity is obtained, denoting maximum oligomerization. The polyamide acid, in solution and under an inert atmosphere, is subsequently heated to about 100° C. to 240° C. to convert the polyamide acid to the polyimide. The polyimide may be alternatively prepared by mixing the diamine and dianhydride at room temperature in a solvent such as nitrobenzene and then rapidly heating the mixture to reflux for about 2 to 12 hours.

The polyimides can be precipitated from their solutions by use of a nonsolvent for the oligomer such as methanol, water, or acetone. The polyimide oligomers are then oven dried, vacuum tumble dried or spray dried and the like. The resulting granular material can be used as a powder thermoset molding type composition. Other appropriate ingredients can be added to the polyimide solutions or molding powders including fillers, dyes, pigments, thermal stabilizers and reinforcing agents, such as glass fiber, carbon, boron and the like, depending on the end use.

Processing of Prepregs

The polyimide oligomers of the present invention can be prepregged by numerous techniques well-known to those skilled in the art. For example, one such procedure is to prepare prepregs from unsized AS-4 carbon fibers and polyimide/NMP solutions with viscosities ranging from 2,000 to 10,000 mPa.s, using a drum winder. The prepregs are allowed to dry on the drum and then stored in plastic bags at room temperature. Under this procedure, residual solvent contents are typically in the range of 10 to 20% by weight and the thickness of the prepregs is approximately 0.56 mm (0.022 inch). In general, some prepregs are tacky, while others am dry due to precipitation of the polyimide oligomer.

Alternatively, a treater line can be employed using sized fiber and various organic solvents, alone or in combination, such as diglyme, dimethylformamide, N-methylpyrrolidone, methylethylketone, dioxalane and the like with a resin content ranging from about 35 to 42% by weight and residual solvents of about 20 to 35% by weight.

Processing of Composite Laminates

The prepregged polyimide oligomers of the present invention can be processed into composite laminates by numerous techniques well-known to those skilled in the art. For example, the prepregs are laid up, vacuum bagged and compression molded into unidirectional laminates based on the following schedule:

1. Cure: a press is heated from room temperature to about 290°–295° C. with 30 inch vacuum applied when the temperature reaches about 270°–290° C., and held for 2 hours.
2. Post-cure: the press is gradually heated up to about 316° C. and 200 psi pressure is applied when the temperature reaches 280° C.
3. After about 16 hours at about 316° C., the press is cooled slowly (1.5° C./min) to about 65° C. and the laminate is demolded.

The resin content of the resultant laminate is obtained, for example, according to the ASTM-D3171 method.

EXAMPLES

In the following examples, as well as elsewhere in the specification and claims, the temperature is in degrees Celsius and the pressure is atmospheric, unless otherwise clearly indicated. While these examples are presented to show one skilled in the art how to operate within the scope of the invention, the examples are not to serve as a limitation on the scope of the invention.

Example 1

Synthesis of a 5,000 MW DAPI/BPADA/ANA Polyimide Oligomer (I)

Diaminophenylindane (DAPI), 39.96 grams (0.1500 mole), 9.450 grams (0.04630 mole) of allylnadic anhydride (ANA) formula (c-2), and 300 mls of N-methylpyrrolidone (NMP) is charged into a one liter flask. The solution is stirred under nitrogen at room temperature (25° C.) for five hours. To the stirring solution is added 65.88 grams (0.1266 mole) of 2,5-bis[4-(3,4-dicarboxyphenoxy)phenyl]propane dianhydride (BPADA) and 150 mls of NMP. The solution is then stirred overnight (12–15 hours) at ambient temperature. The polyamic-acid is then imidized chemically over a six hour period, while stirring, by adding 67.40 grams (0.660 mole) of acetic anhydride and 33.39 grams (0.3300 mole) of triethylamine. The product is then precipitated by pouring the solution into methanol and the resulting precipitate collected via vacuum filtration. The polyimide is then soaked in methanol followed by a hot water (70° C.) soak overnight. The polyimide is then dried in an air circulating oven overnight and afterwards in a vacuum oven at 150° C. The polyimide has an intrinsic viscosity of 0.17 and molecular weights (GPC using polystyrene standards): Mw=12,533, Mn=5,129, Mw/Mn=2.44; Tg=256° C. via DSC. The molar ratios are 1:0.84:0.31 DAPI/BPADA/ANA.

Example 2

Synthesis of a 5,000 Mw DAPI/BPADA/NBC Polyimide Oligomer (I)

Into a reaction vessel is placed 106.98 grams (0.4016 mole) of DAPI, 175.28 grams (0.3368 mole) of BPADA, and 1.25 liters of NMP. The solution is stirred at ambient temperature, under a stream of nitrogen, for 1.5 hours. To the solution is added 87 grams of toluene. The reaction mixture is then azeotropically refluxed to 155° C., collecting the water in a Dean & Stark trap.

The reaction mixture is cooled down after the theoretical amount of water is removed. Upon reaching room temperature 13.70 grams (0.1354 mole) of triethyl amine and 63.8 grams (0.1379 mole) of 3,5-Dinadic benzoyl chloride (DNBC) formula (c-9) are added to the reaction, and the reaction mixture is stirred for 4 hours. The work-up and isolation is done as shown in example 1. The corresponding polyimide has an intrinsic viscosity of 0.18 and molecular weights (GPC using polystyrene standards): Mw=12,077, Mn-6,235, Mw/Mn=1.93; Tg=254° C. The molar ratios are 1:0.84:0.34 DAPI/B-PADA/DNBC.

Example 3

Synthesis of a 10,000 Mw DAPI/BPADA/DNBC Polyimide Oligomer (I)

The same procedure is used as is shown in example 2 except for the amounts of materials used (i.e. molar ratios). 206.05 Grams (0.3959 mole) of BPADA, 111.88 grams (0.4200 mole) of DAPI, 24.00 grams (0.0518 mole) of DNBC, 5.770 grams (0.0569 mole), and 1.5 liters of NMP are employed. The corresponding polyimide has an intrinsic viscosity of 0.27 and molecular weights (GPC using polystyrene standards): Mw=22,053, Mn=10,638, Mw/Mn=2.07; Tg=234° C. The molar ratios are 1.0:0.94:0.12 DAPI/B-PADA/DNBC.

Examples 4–10

Following procedures similar to those outlined in examples 1–3, polyimide oligomers are prepared from BPADA, DAPI and the end-capping monomers shown in Table I

TABLE I

| Example | End-cap monomer |
|---------|-----------------|
| 4 | 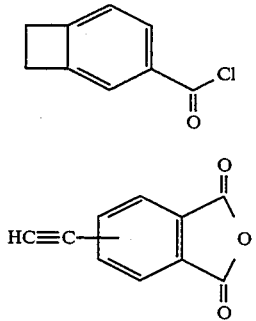 |
| 5 | 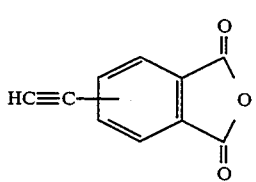 |
| 6 | 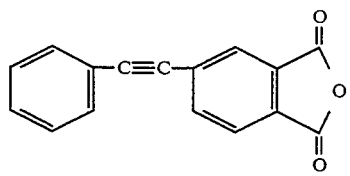 |

TABLE I-continued

| Example | End-cap monomer |
|---------|-----------------|
| 7 | 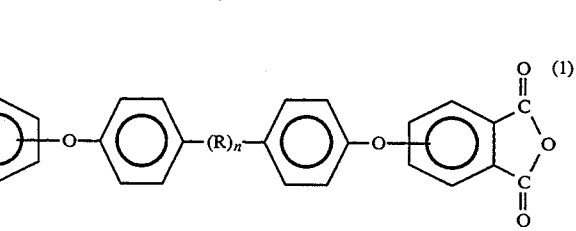 |
| 8 | |
| 9 | |
| 10 | 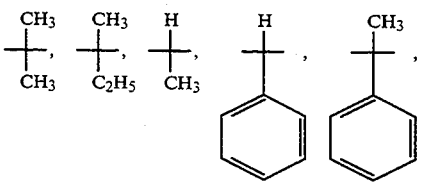 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polyimide oligomer which has a number average molecular weight ($M_n$) of from about 1000 to about 15,000 comprising the intercondensation product of a monomer mixture comprising (A) at least one aromatic bis(ether anhydride), (B) at least one phenylindane diamine, and (C) at least one end-cap monomer selected from the group consisting of monoanhydrides, acyl halides and amines, wherein each end-cap monomer (C) contains at least one crosslinkable group in the molecule and wherein the phenylindane diamine component (B) is present in the mixture in a stoichiometric excess.

2. A polyimide oligomer according to claim 1, wherein (A) is at least one aromatic bis(ether anhydride) represented by the formula

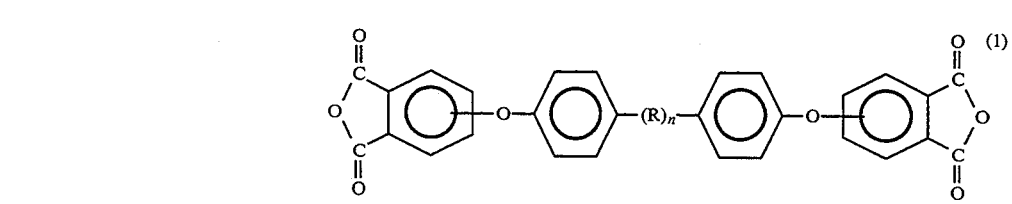

wherein R is a divalent radical selected from the group consisting of

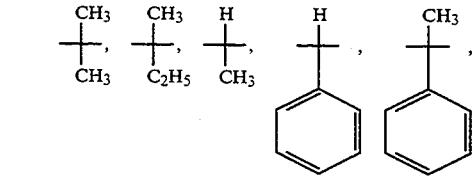

-continued

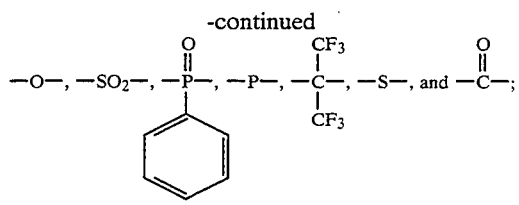

and n is 0 or 1.

3. A polyimide oligomer according to claim 2, wherein (A) is at least one aromatic bis(ether anhydride) represented by the formula

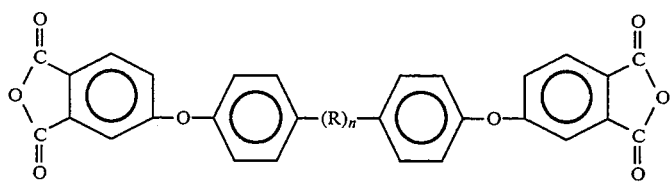

(1a)

wherein R is selected from the group consisting of

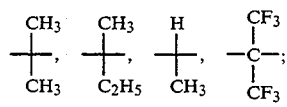

and n is 1.

4. A polyimide oligomer according to claim 3, wherein (A) is an aromatic bis(ether anhydride) represented by the formula

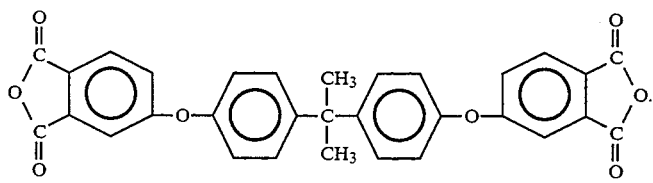

5. A polyimide oligomer according to claim 1, wherein (B) is at least one phenylindane diamine represented by the formula

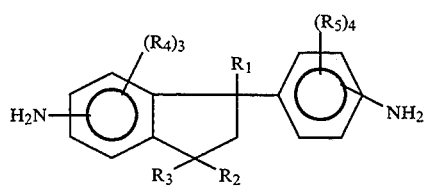

(2)

wherein $R_1$, $R_2$ and $R_3$ independently are hydrogen or an alkyl group of from 1 to 4 carbon atoms, and each $R_4$ and each $R_5$ independently is hydrogen, halogen or alkyl having 1 to 4 carbon atoms.

6. A polyimide oligomer according to claim 5, wherein (B) is at least one phenylindane diamine represented by the formula

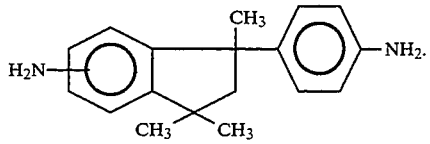

7. A polyimide oligomer according to claim 1, wherein (C) is at least one end-cap monomer selected from the group consisting of monoanhydrides, acyl halides and amines, wherein each end-cap monomer (C) contains at least one crosslinkable group in the molecule selected from the group consisting of vinyl, ethynyl, maleimido, cyano, nadic and acetylenic functions.

8. A polyimide oligomer according to claim 1, wherein (C) is at least one end-cap monomer selected from the group consisting of

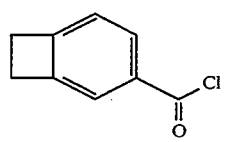

(c-1)

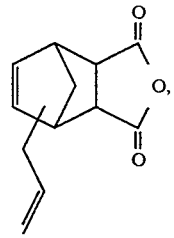

(c-2)

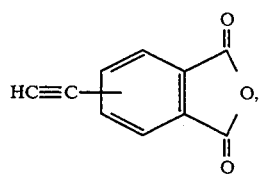

(c-3)

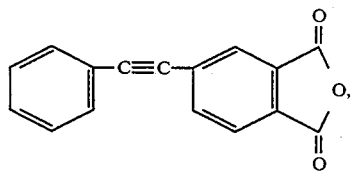

(c-4)

-continued (c-5) 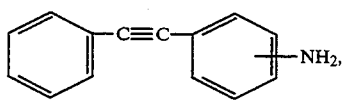

(c-6) 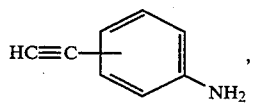

(c-7) 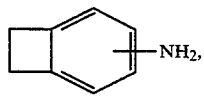

(c-8) 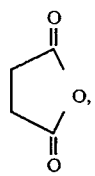

and (c-9) 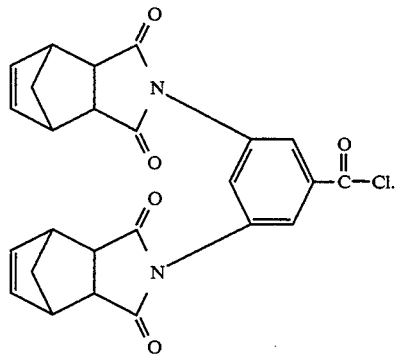

9. A polyimide oligomer according to claim 1, wherein the molar ratio (A)+(C):(B) is from about 0.81:1.0 to about 1.47:1.0.

10. A polyimide oligomer according to claim 1, wherein the molar ratio (A):(B):(C) employed in the intercondensation reaction is about 0.75–0.97:1.0:0.06–0.50.

11. A polyimide oligomer represented by the formula (I) 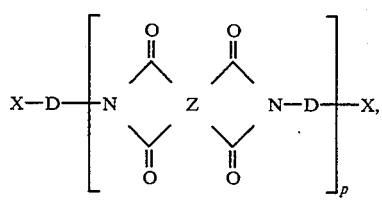

or (II) 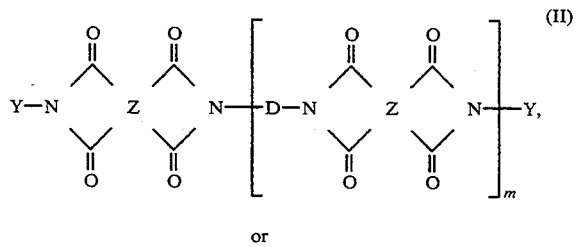

-continued (III) 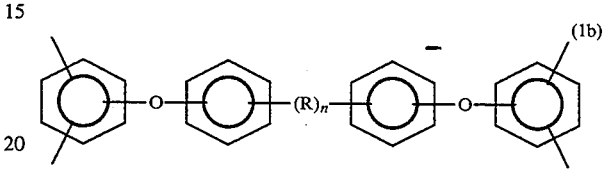

wherein

Z is a tetravalent radical represented by the formula (1b) 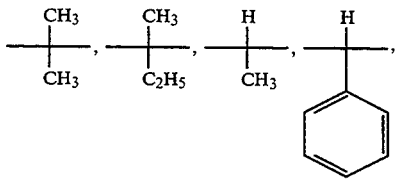

wherein R is a divalent radical selected from the group consisting of

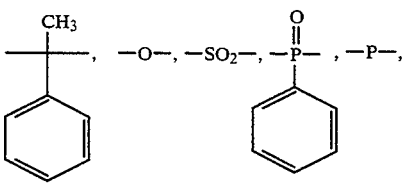

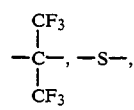

and

and n is 0 or 1;

D is a divalent radical represented by the formula (2a) 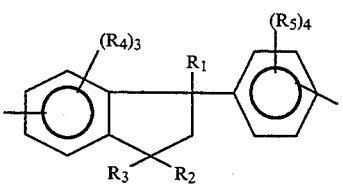

wherein $R_1$, $R_2$ and $R_3$ independently are hydrogen or an alkyl group of from 1 to 4 carbon atoms, and each $R_4$ and each $R_5$ independently is hydrogen, halogen or alkyl having 1 to 4 carbon atoms;

X is amino (—NH$_2$) or a monovalent radical selected from the group consisting of N-imides and N- amides, each containing at least one crosslinkable group in the radical;

Y is a monovalent $C_{(6-30)}$ aromatic hydrocarbon radical containing at least one crosslinkable group in the radical; and m, o and p have numerical values of from about 3 to about 20.

12. A polyimide oligomer according to claim 11, wherein R is selected from the group consisting of

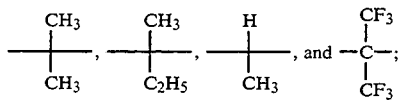

and n is 1.

13. A polyimide oligomer according to claim 12, wherein R is

and n is 1.

14. A polyimide oligomer according to claim 11, wherein $R_1$, $R_2$ and $R_3$ are methyl, and $R_4$ and $R_5$ are hydrogen.

15. A polyimide oligomer according to claim 11, wherein X is an N-imide or an N-amide radical selected from the group consisting of

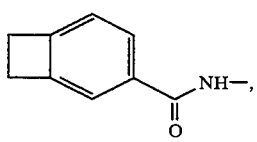

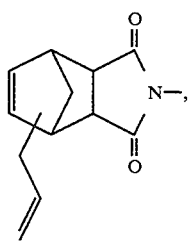

-continued

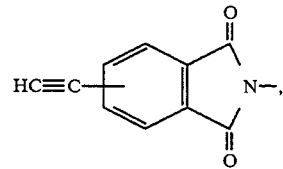

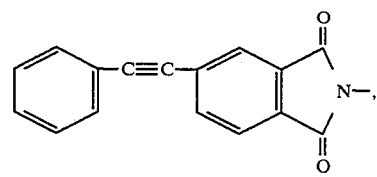

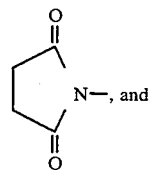

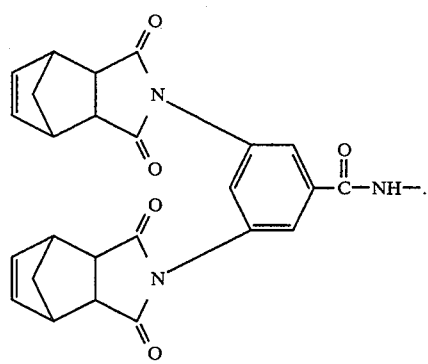

16. A polyimide according to claim 11, wherein Y is a monovalent $C_{(6-30)}$ aromatic hydrocarbon radical selected from the group consisting of

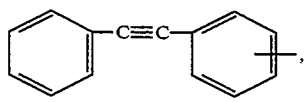

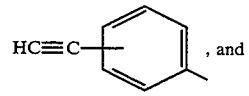

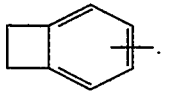

17. A polyimide oligomer according to claim 11, which has a number average molecular weight ($M_n$) of from about 1000 to about 15,000.

* * * * *